Sept. 1, 1964  M. L. BENJAMIN ETAL  3,146,641
RECESSING TOOL
Filed Oct. 26, 1961

INVENTORS
MILTON L. BENJAMIN &
BY  ELMER J. KALAT
Oberlin, Maky & Donnelly
ATTORNEYS 3,146,641
RECESSING TOOL
Milton L. Benjamin, Shaker Heights, and Elmer J. Kalat, Cleveland, Ohio, assignors to Erickson Tool Company, Solon, Ohio, a corporation of Ohio
Filed Oct. 26, 1961, Ser. No. 147,983
7 Claims. (Cl. 77—58)

The present invention relates generally as indicated to a recessing tool and more particularly to a recessing tool for forming, for example, undercuts in spool valve bores and the like.

As known in the spool valve art, the housing bores are generally of relatively great length and are intersected axially therealong by undercuts, or passages such as, for example, bypass passages, pressure feed passages, service port passages, and return passages. Accordingly, recessing operations in such long bores presents a problem in providing adequate lateral support for the relatively long and slender recessing tool.

Accordingly, it is one principal object of this invention to provide a simple and efficient form of recessing tool by which recesses may be accurately formed in deep bores.

It is another object of this invention to provide a recessing tool which may easily be adjusted to form recesses of different diameters.

It is another object of this invention to provide a recessing tool in which the cutting bit may be adjusted to compensate for repeated sharpenings and which may be replaced, when required, at low cost.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 1:
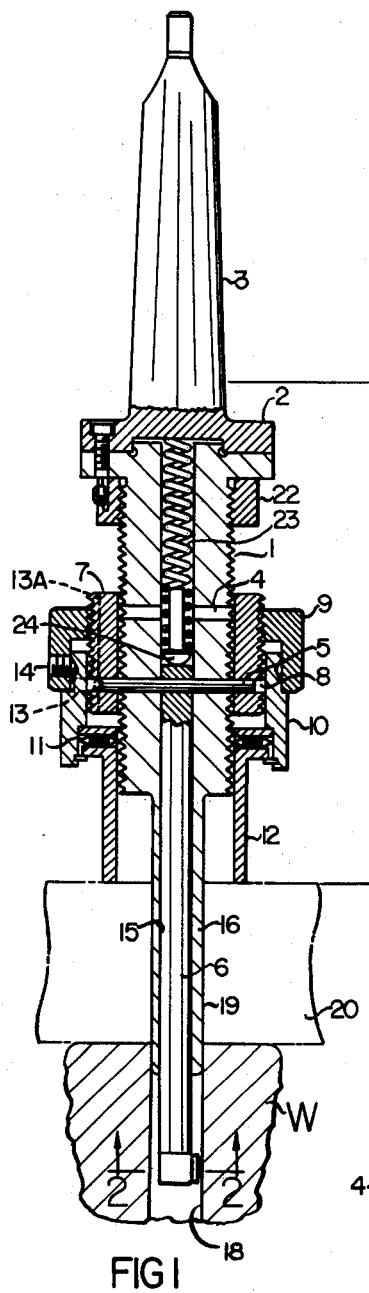
FIG. 1 is a cross-section view of one form of recessing tool wherein increasing lateral support is provided for the shank of the cutting tool as the cutting tool is moved into engagement with the work and as it progresses to cut a recess in the workpiece bore.
Figure 3:
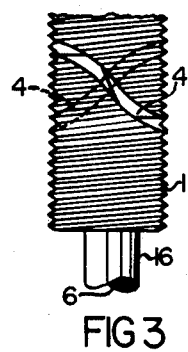
FIG. 3 illustrates the body of the tool which is formed with helical cams effective to turn the cutter shaft into and out of engagement with the wall of workpiece bore.
Figure 2:
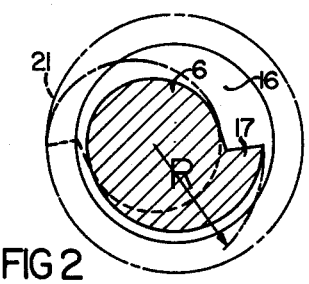
FIG. 2 is an enlarged section view along line 2—2, FIG. 1 of the cutting end of the tool with the work and to form a recess therein.

Referring now in detail to the drawings, and first to FIGS. 1 to 3, the body 1 of the recessing tool herein is mounted on the flange 2 of a tapered shank 3 which, in well-known manner, fits in the tapered socket of a drill press or machine tool spindle. The body 1 has a helical slot 4 therethrough which extends for one-half turn at least, the width of the slot 4 being approximately equal to the diameter of the cross pin 5 which extends diametrically through the cutter shaft 6.

Journalled on the body 1 is a sleeve 7 formed with a hole 8 diametrically therethrough for receiving the ends of said cross pin 5, the hole 8 being of oblong cross section to accommodate the pin ends as the pin 5 is turned about the central axis of shaft 6. Threaded on said sleeve 7 is a nut 9 to which the sleeve 10 is fixed to constitute an adjustable retainer for a thrust bearing 11 and locating or thrust sleeve 12. The sleeve 10 is axially adjustably keyed on sleeve 7 by pin 13 of sleeve 10 disposed in keyway 13A of sleeve 7. It can be seen that when set screw 14 is loosened the nut 9 may be turned in either direction to vary the reference dimension A from the machine spindle (not shown) to the end of sleeve 12. The cutter shaft 6 is slidably fitted in a longitudinal bore 15 of the body 1 which is eccentric with respect to the tubular support pilot or extension 16 of the body 1 whereby, as best shown in FIG. 2, when the cutter shaft 6 is in the position shown in full lines, the cutting lip 17 and the extension 16 may be inserted into the coaxial bores 18 and 19 of the workpiece W and a stop plate 20 for cutting of a recess in the wall of bore 18. When the cutter shaft 6 is turned, the cutting edge 17 moves radially to engage and to remove metal from the wall of the bore 18 to form a recess 21 of maximum diameter when the cutter is turned 180° to the dot-dash line position. If the recess 21 is to be of smaller diameter, the adjusting nut 22 on the body 1 will be adjusted toward the sleeve 7 to arrest rotation of the cutter shaft 6 at an angle less than 180°.

Yieldably holding the cutting edge 17 and shaft 6 in the FIG. 2 solid line position is a coil spring 23 with a round head pin 24 bearing on the end of the cutter shaft 6.

From the foregoing, it can be seen that when the cutter shaft 6 is in the FIG. 2 position with the cutting edge 17 retracted, the recessing tool assembly may be shifted axially downwardly as viewed in FIG. 1 with the extension 16 guided in the bore 18 of the workpiece W until the trust sleeve 12 engages the stop plate 20. Now, as the cutter shaft 6 is rotating about the central axis of the shank 3, body 1 and outer surface of extension 16, the recessing tool assembly is axially advanced downwardly to cause turning of the cutter shaft 6 with respect to the body 1, by cross-pin 5 engaged in the helical slot 4 of body 1 whereby the cutting edge 17 will progressively move radially outward to engage the wall of the workpiece bore 18 and thus to form a recess therein of diameter depending on the extent of turning of the cutter shaft 6 as limited by the adjustment of the nut 22 which abuts the sleeve member 7. As the shank 3 and body 1 are moved axially downwardly, the end of the extension 16 moves closer to the cutting end of the cutter shaft 6, whereby to provide a strong lateral support for the latter, especially when the extension 16 has a sliding fit in the bore 18 which is being recessed.

From FIG. 2 it can be seen that when the cutting edge 17 is sharpened, its radius R will decrease so as not to enable the cutting of the maximum recess 21. However, smaller than maximum recesses may be continued to be cut with resharpened cutter shafts 6 by turning the cutter shaft 6 through a greater angle after each resharpening.

Figure 4:
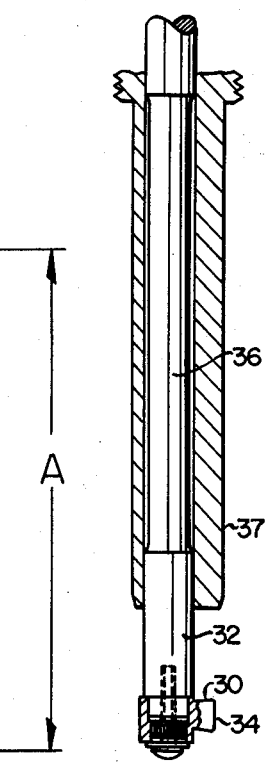
FIGS. 4 and 5 illustrate different forms of recessing tools having replaceable and adjustable bits thereon.
Figure 5:
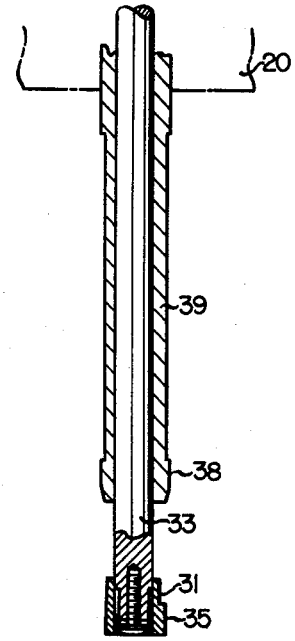

In order to enable replacement of the cutting tool 17 by itself without replacement of the integral shaft 6 as in FIG. 1, there is provided in FIGS. 4 and 5 splined connections of the respective bits 30 and 31 on the cutter shafts 32 and 33 which enable maintenance of substantially the same adjustments of the tools 30 and 31 and the same maximum diameters of recess cut thereby despite repeated sharpenings of the cutting edges 34 and 35. Thus, initially, the cutting edge 34 or 35 may be disposed so that it will rotate less than 180° to the maximum radial position, whereby when the tool 30 or 31 is sharpened, it will approach the zero retracted position and will be turned to the 180° maximum position and, conversely, by reason of the serrations or splines, it can be mounted in different rotary positions on the cutter shaft 32 or 33 to bring the cutting edge 34 or 35 approximately to the zero degree position after each sharpening.

FIG. 4 shows a relieved portion 36 on the cutter shaft 32 to provide widely spaced zones for rigid support of the cutter bar 32 in extension 37 and in the bore of the workpiece. FIG. 5 shows an extension 38 with a relieved portion 39 to provide widely spaced bearing surfaces in the stop plate 20 and in the deep bore 18 of the workpiece W.

Other modes of applying the principle of the invention may be employed, change being made as regards the details described, provided the features stated in any of the following claims, or the equivalent of such, be employed.

We therefore particularly point out and distinctly claim as our invention:

1. A recessing tool comprising a body having a tubular extension adapted for axial sliding engagement with the wall of a workpiece bore to be recessed and an eccentrically disposed bore; a cutter shaft rotatable in said eccentric bore and having a cutting edge which is axially spaced from one end of said extension and which moves radially outward of said extension when said shaft is turned in said eccentric bore, said shaft being laterally fixed relative to said body; a cross-pin extending diametrically through said shaft; said body having a helical slot receiving the ends of said cross-pin for turning said shaft upon axial movement of said body with respect to said shaft; and thrust means having fixed axial relation to said shaft and cross-pin whereby axial advance of said body and extension moves said one end of the latter closer to said cutting edge to provide increased lateral support for said shaft adjacent to said cutting edge, said thrust means comprising a first thrust member adapted to engage a locating stop, a second thrust member rotatable on said body and having openings to receive the ends of said cross-pin, and an anti-friction thrust bearing between said thrust members to enable relative rotation thereof.

2. A recessing tool comprising a body having a tubular portion with an eccentrically disposed bore; a cutter shaft rotatable in said eccentric bore and having a cutting edge which is axially spaced from the end of said tubular portion and which moves spirally outward with respect to said tubular portion when said shaft is turned in said eccentric bore, said shaft being laterally fixed relative to said body; a cross-pin extending diametrically through said shaft; said body having a helical slot receiving the ends of said cross-pin for turning said shaft upon axial movement of said body with respect to said shaft; and thrust means having fixed axial relation to said shaft and cross-pin whereby axial advance of said body with respect to said shaft and thrust means turns said shaft to effect movement of said cutting edge to form a recess in the wall of a bore in which said shaft is adapted to be inserted, said thrust means having slots to receive the ends of said cross-pin and thus to maintain said shaft and thrust means in fixed axial relation to each other.

3. A recessing tool comprising a body having a tubular portion with an eccentrically disposed bore; a cutter shaft rotatable in said eccentric bore and having a cutting edge which is axially spaced from the end of said tubular portion and which moves spirally outward with respect to said tubular portion when said shaft is turned in said eccentric bore, said shaft being laterally fixed relative to said body; a cross-pin extending diametrically through said shaft; said body having a helical slot receiving the ends of said cross-pin for turning said shaft upon axial movement of said body with respect to said shaft; and thrust means having fixed axial relation to said shaft and cross-pin whereby axial advance of said body with respect to said shaft and thrust means turns said shaft to effect movement of said cutting edge to form a recess in the wall of a bore in which said shaft is adapted to be inserted, said thrust means comprising a first thrust member adapted to engage a locating stop, a second thrust member rotatable on said body and having slots to receive the ends of said cross-pin, and an anti-friction thrust bearing between said thrust members to enable relative rotation thereof.

4. The recessing tool of claim 3 wherein a stop collar is axailly adjustable on said body to engage said second thrust member and thus to determine the extent of axial movement of said body and, consequently, the degree of turning of said shaft.

5. A recessing tool comprising a body having a tubular extension with an eccentrically disposed bore; a cutter shaft rotatable in said eccentric bore and having a cutting edge which is axially spaced from the end of said tubular extension and which moves spirally radially outwardly beyond said tubular extension when said shaft is turned in said eccentric bore, said shaft being laterally fixed relative to said body; a cross-pin extending diametrically through said shaft; said body having a helical slot receiving the ends of said cross-pin for turning said shaft upon axial movement of said body with respect to said shaft; and thrust means having fixed axial relation to said shaft and cross-pin whereby axial advance of said body with respect to said shaft and thrust means turns said shaft to effect movement of said cutting edge to form a recess in the wall of a bore in which said shaft is adapted to be inserted; the shape and disposition of said slot in said body and the length of said tubular extension being such that said tubular extension is adapted to move from a position remote from said cutting edge to a position adjacent said cutting edge during such axial advance of said body with respect to said shaft and thrust means to provide increased lateral support for said shaft and cutting edge during the forming of such recess.

6. The recessing tool of claim 5 wherein said shaft has an intermediate portion of smaller diameter than said bore to provide axially spaced portions on said shaft that are supported by said extension.

7. The recessing tool of claim 5 wherein said extension has an intermediae portion of smaller diameter than the ends thus to provide axially spaced end portions adapted to be guided in a workpiece bore.

References Cited in the file of this patent

UNITED STATES PATENTS

| | | |
|---|---|---|
| 2,585,038 | Rogacki | Feb. 12, 1952 |
| 2,847,882 | Benjamin et al. | Aug. 19, 1958 |
| 2,848,912 | Kalat | Aug. 26, 1958 |
| 3,017,791 | Fried | Jan. 23, 1962 |